(12) United States Patent
Hong (10) Patent No.: US 7,033,701 B2
(45) Date of Patent: *Apr. 25, 2006

(54) LITHIUM SECONDARY CELL AND METHOD OF FABRICATING THE SAME

(75) Inventor: Ji Jun Hong, Nonsan Shi (KR)

(73) Assignee: Kokam Co., Ltd., Sikung-Si (KR)

( * ) Notice: Subject to any disclaimer, the term of this patent is extended or adjusted under 35 U.S.C. 154(b) by 548 days.

This patent is subject to a terminal disclaimer.

(21) Appl. No.: 10/162,542

(22) Filed: Jun. 3, 2002

(65) Prior Publication Data

US 2003/0008206 A1    Jan. 9, 2003

Related U.S. Application Data

(63) Continuation of application No. 09/518,277, filed on Mar. 3, 2000, now Pat. No. 6,423,449.

(30) Foreign Application Priority Data

Dec. 20, 1999   (KR) .................................. 99-59182

(51) Int. Cl.
*H01M 10/14*   (2006.01)

(52) U.S. Cl. .................................. 429/231.95; 429/129

(58) Field of Classification Search ............... 429/127, 429/158, 162, 161, 124, 231.95, 218.1
See application file for complete search history.

(56) References Cited

U.S. PATENT DOCUMENTS 5,498,489 A    3/1996   Dasgupta et al.
5,582,931 A *  12/1996  Kawakami .................. 429/127
5,989,741 A    11/1999  Bloomfield et al.
6,423,449 B1 * 7/2002   Hong ..................... 429/231.95

FOREIGN PATENT DOCUMENTS

| DE | 19540845 A1 | 5/1996 |
| EP | 0602976 A1  | 12/1993 |
| EP | 0682376 A1  | 5/1995 |
| JP | 55-144763   | 4/1979 |
| KR | 1998-16522  | 6/1998 |

OTHER PUBLICATIONS

B.K. Petrin, *Chemical Sources of Electrical Current with a High Energy Capacity*, Moscow, VINITI, pp. 76, 77 (1986).

* cited by examiner

*Primary Examiner*—Michael Barr
*Assistant Examiner*—Monique Wills
(74) *Attorney, Agent, or Firm*—Fredrikson & Byron, P.A.

(57) ABSTRACT

The present invention relates to a lithium secondary cell and a method of fabricating the same. The lithium secondary cell; a plurality of cathode plates having a desired size and adhered on one surface of the separator film while being uniformly spaced apart from one another; a plurality of anode plates having a desired size and adhered on the other surface of the separator film at spaced positions corresponding to the cathode plates; and the separator film attached with the anode plates and the cathode plates being repeatedly folded such that the anode plates and the cathode plates are arranged in an alternating fashion. Thus, the lithium secondary cell has improved performance and particularly safety by preventing a firing caused by high current and excessive voltage charged, while having various shapes and sizes, and a desired capacity and achieving a simplified fabrication.

20 Claims, 10 Drawing Sheets

FIG. 13

LITHIUM SECONDARY CELL AND METHOD OF FABRICATING THE SAME

CROSS REFERENCES AND RELATED APPLICATIONS

This application is a continuation application of U.S. patent application Ser. No. 09/518,277, filed on Mar. 3, 2000 now U.S. Pat. No. 6,423,449. The present application hereby claims priority to and incorporates by reference the entire contents of U.S. patent application Ser. No. 09/518,277, filed on Mar. 3, 2000.

BACKGROUND OF THE INVENTION

1. Field of the Invention

The present invention relates to a lithium secondary cell having a configuration in which anode plates and cathode plates are arranged in an alternating fashion, thereby allowing the lithium secondary cell to have improved performance and stability, various shapes and sizes, and a desired capacity while achieving a simplified fabrication. The present invention also relates to a method of fabricating the lithium secondary cell.

2. Description of the Prior Art

With recent development in telecommunication and portable phone industries, a more compact, lighter, portable, and high performance-lithium secondary cell is of need.

In general, the lithium secondary cell has a triple-layer structure of cathode/separator film/anode, or a five layer structure of cathode/separator film/anode/separator film/cathode. Conventional methods of fabricating the lithium secondary cell of a reasonable capacity include a laminating method and a winding method.

Figure 1A:
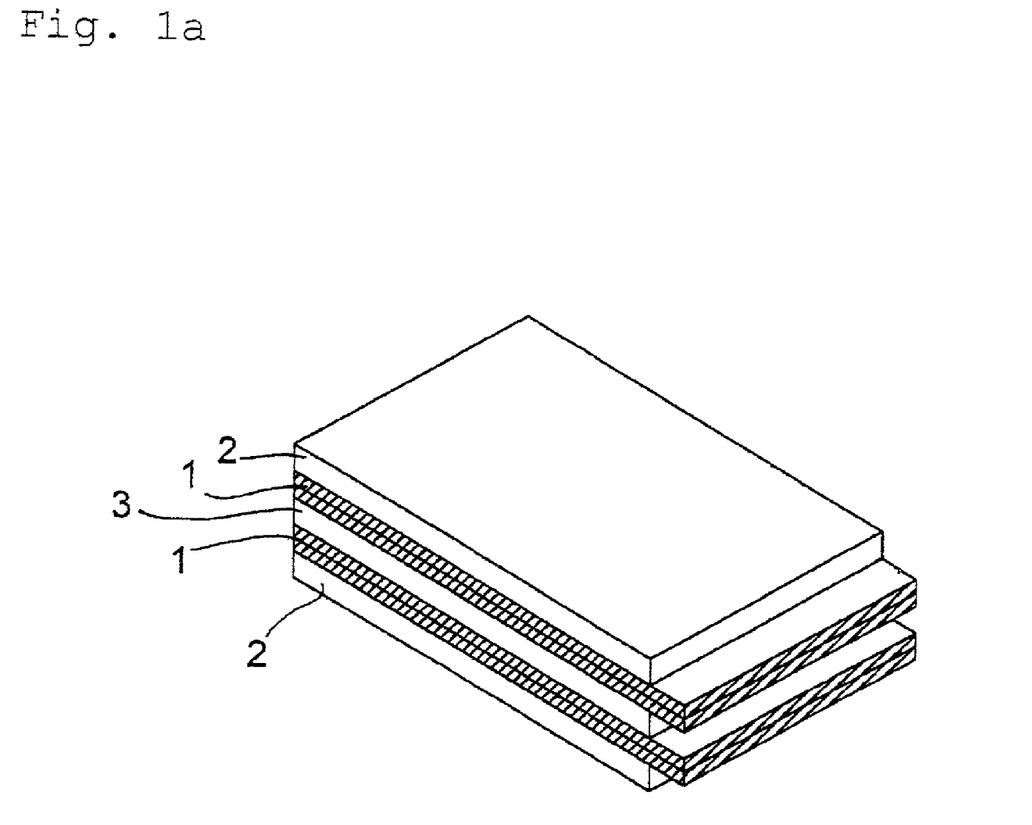
FIG. 1a is a perspective view showing a structure of a lithium secondary cell fabricated in accordance with a conventional laminating method.
Figure 1B:
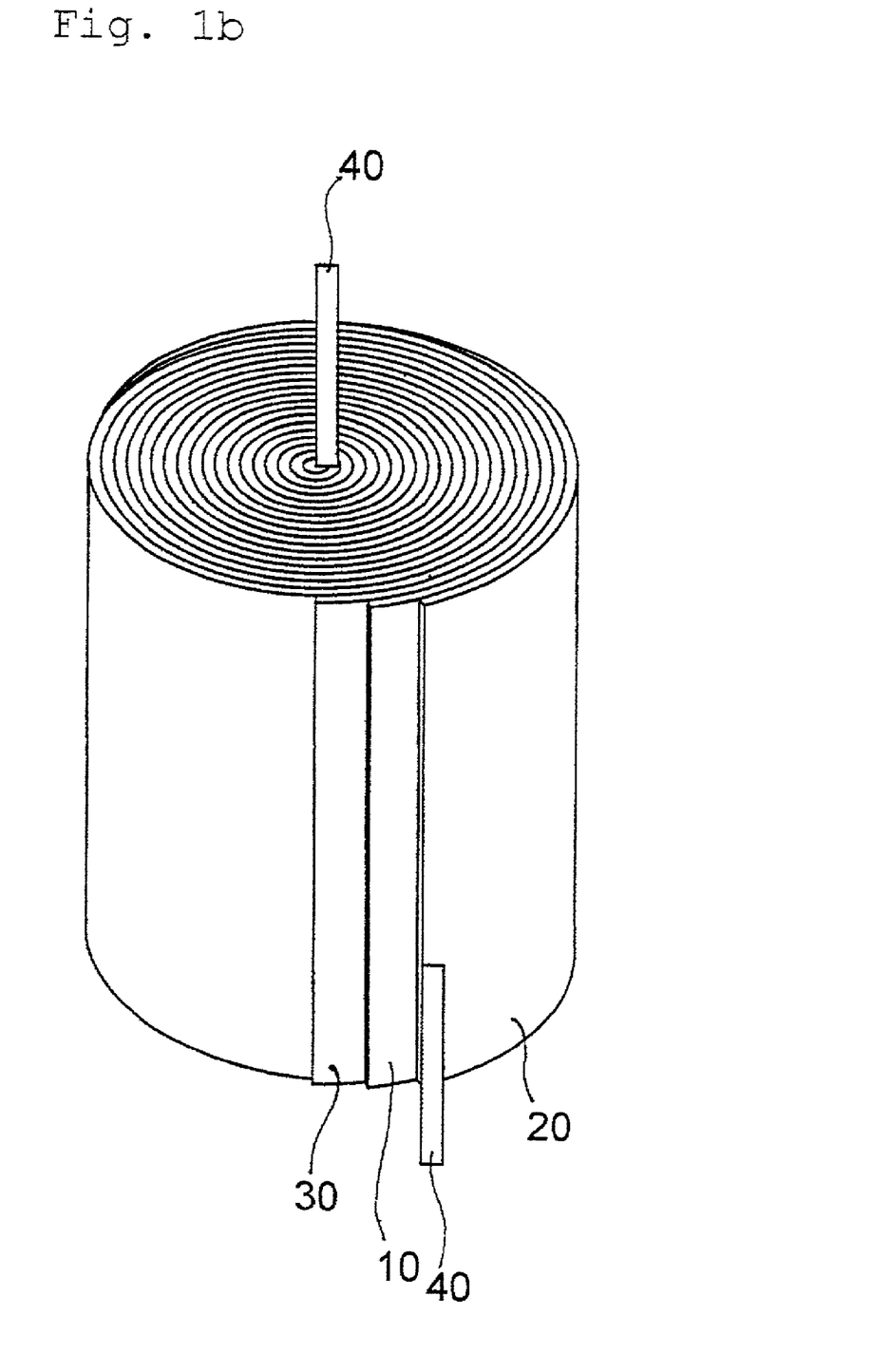
FIG. 1b is a perspective view showing a structure of a lithium secondary cell fabricated in accordance with a conventional winding method.

Structures of lithium secondary cells fabricated in accordance with conventional methods are shown in FIGS. 1a and 1b. FIG. 1a is a perspective view showing a lithium secondary cell having a unit cell of a structure consisting of cathode 2/separator film 1/anode 3. Such a secondary cell comprises a plurality of unit cells, each having the cathode and anode plates 2 and 3 heat-adhered on the separator film 1. A plurality of the unit cells are laminated and connected to each other in parallel depending on a desired capacity of the lithium secondary cell.

However, in the lithium secondary cell shown in FIG. 1a, the cathode plate, the separator film, and the anode plate, are heat-adhered (laminated) to each other. Thus, when the lithium secondary cell is continuously excessively charged, due to the wrong use of the cell by user or the control indisposition of a charger, it is continuously increased in voltage such that it is likely to be fired. Further, a process for heat-adhering the cathode plate and the anode plate onto the separator film, and a process for laminating the unit cells to each other, are complex. This results in a decrease in a cell fabrication.

FIG. 1b is a perspective view showing a lithium secondary cell fabricated in accordance with the conventional winding method. Such a lithium secondary cell is fabricated by winding, on a central core, a unit cell having a structure of a cathode 20/separator film 10/anode 30 and having a length meeting a desired capacity of the cell.

As the lithium secondary cell fabricated according to the winding method has a cylindrical shape, it is relatively heavy in weight and relatively large in size. Moreover, positions, at which electrodes 40 can be attached, are limited to a position at a concentric circle axis of the cylinder, and another position at the winding end.

SUMMARY OF THE INVENTION

It is therefore an object of the present invention to solve the above mentioned problems, and to provide a lithium secondary cell having improved performance and particularly safety by preventing a firing caused by high current and excessive voltage charged, while having various shapes and sizes, and a desired capacity and achieving a simplified fabrication.

Also, another object of the present invention is to provide a method of fabricating the lithium secondary cell.

In accordance with an aspect of the present invention, there is provided a lithium secondary cell comprising: a separator film; a plurality of cathode plates having a desired size and adhered on one surface of the separator film while being uniformly spaced apart from one another; a plurality of anode plates having a desired size and adhered on the other surface of the separator film at spaced positions corresponding to the cathode plates; and the separator film attached with the anode plates and the cathode plates being repeatedly folded such that the anode plates and the cathode plates are arranged in an alternating fashion.

In accordance with another aspect of the present invention, there is provided a method of fabricating a lithium secondary cell, comprising the steps of: applying an adhesive on a separator film; adhering a plurality of cathode plates having a desired size on a surface of the separator film in such a fashion that they are uniformly spaced apart from one another; adhering a plurality of anode plates having a desired size on the other surface of the separator film in such a fashion that they are spaced apart from one another; and repeatedly folding the separator film attached with the anode plates and the cathode plates such that the anode plates and the cathode plates are arranged in an alternating fashion.

BRIEF DESCRIPTION OF THE DRAWINGS

The above, and other objects and aspects of the invention will be apparent from the following description of embodiments with reference to the accompanying drawings, in which.

DETAILED DESCRIPTION OF THE PREFERRED EMBODIMENTS

A lithium secondary cell in accordance with an embodiment of the present invention will now be described with reference to FIGS. 2 and 3.

Figure 2:
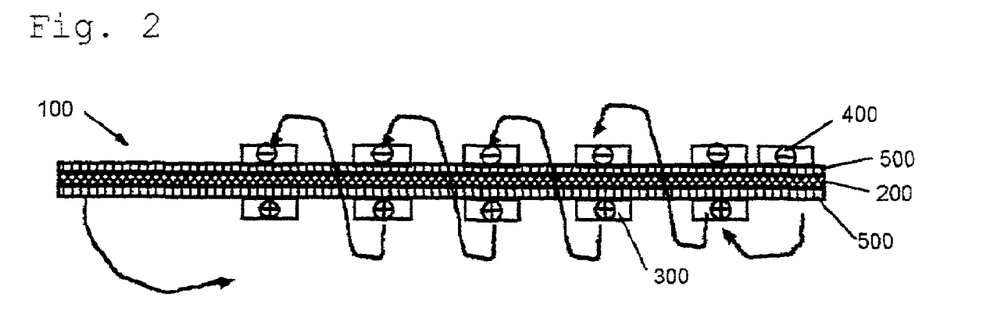
FIG. 2 is a cross-sectional view showing a structure of a lithium secondary cell in accordance with an embodiment of the present invention.
Figure 11:
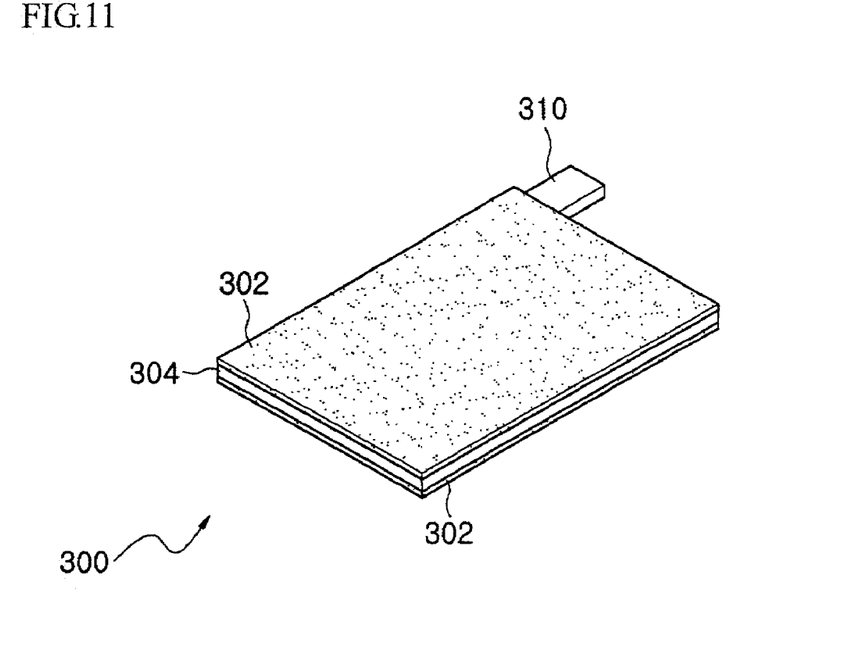
FIG. 11 is a perspective view of a cathode plate included in one embodiment of the lithium secondary cell of the present invention.

As shown in FIG. 2, a crude lithium secondary cell, before folding, consists of a triple-layer structure of cathode plates 300/separator film 200/anode plates 400. The cathode plates 300 are fabricated by applying a cathode activator on a foil made of a metal, such as aluminum, and then drying the resulting foil. Cathode activators include, but are not limited to, $LiCO_2$ and $LiMn_2O_4$. Such cathode plates 300 are cut to have a desired size and adhered on one surface of the separator film 200. In one embodiment of the present invention, as depicted in FIG. 11, the cathode plate 300 is comprised of a cathode material and/or activator 302, that is coated on both sides of cathode current collector 304, such as an aluminum film.

Generally, in this embodiment of the present invention, the positive electrode plate 300 is a standardized product made by applying a positive active material 302, such as (LiCO2)$LiCO_2$, or (LiMn2O2)$LiMn_2O_4$ having a spinal structure or a layered structure, to the surface of a metal plate 304, such as an aluminium foil, drying the applied positive active material 302, cutting the metal plate 304 into pieces of a predetermined size, and providing a positive electrode 310 at a predetermined position (Grid).

The anode plates 400 are fabricated by applying an anode activator on a foil made of a metal, such as copper, and then drying the resulting foil. Anode activators include, but are not limited to, graphite material, or a carbon material processed to have electrochemical characteristics, for example meso-carbon microbeads and meso-phase pitch carbon film. Such anode plates 400 are normally cut to have a desired size and adhered on the other surface of the separator film 200. In one embodiment of the present invention, as depicted in FIG. 12, the anode plate 400 is comprised of an anode material and/or activator 402, that is coated on both sides of an anode current collector 404, such as a copper film.

Generally, in this embodiment of the present invention, the negative electrode plate 400 is a standardized product made by applying a negative active material 402, such as a graphite material or a carbon material processed to have electrochemical characteristics, for example, mesocarbon microbeads, and meso-phase pitch carbon film, to the surface of a metal plate 404, such as a copper foil, drying the applied negative active material 402, cutting the metal plate 404 into pieces of a predetermined size, and providing a negative electrode 410 at a predetermined position (Grid).

Figure 12:
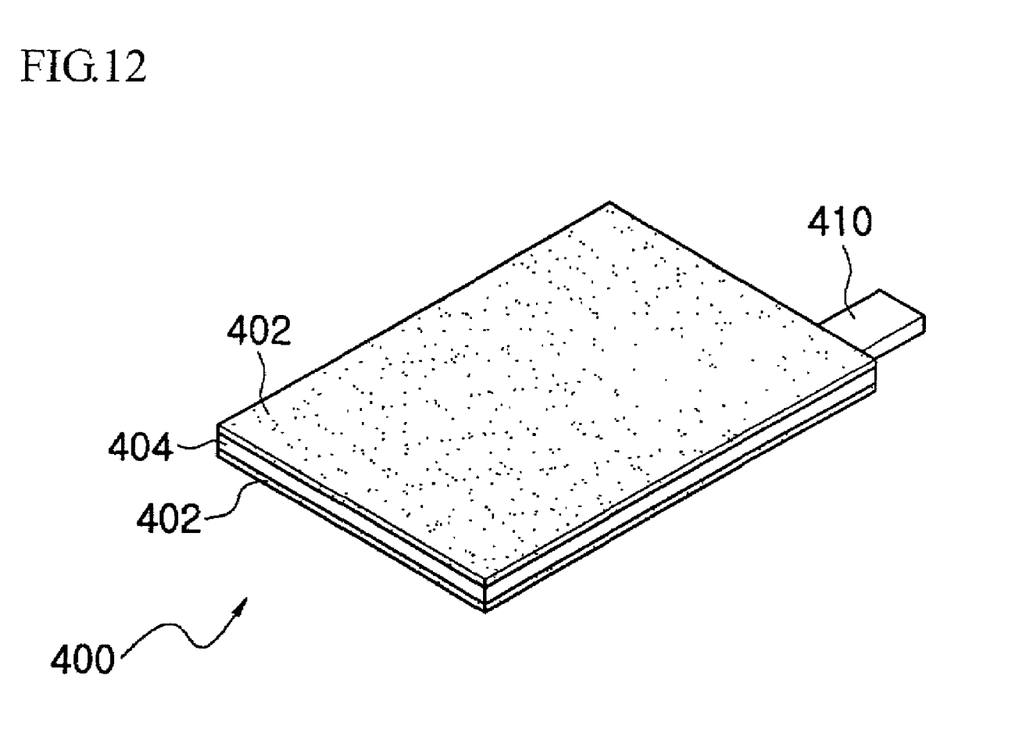
FIG. 12 is a perspective view of an anode plate included in one embodiment of the lithium secondary cell of the present invention.

In FIGS. 11 and 12, each cathode plate 300 and anode plate 400 include coated regions and non-coated regions which is called a grid. All the grids of cathode and anode are collected and welded to an electrode. Each coated region includes part anode material or cathode material when coated.

Figure 9:
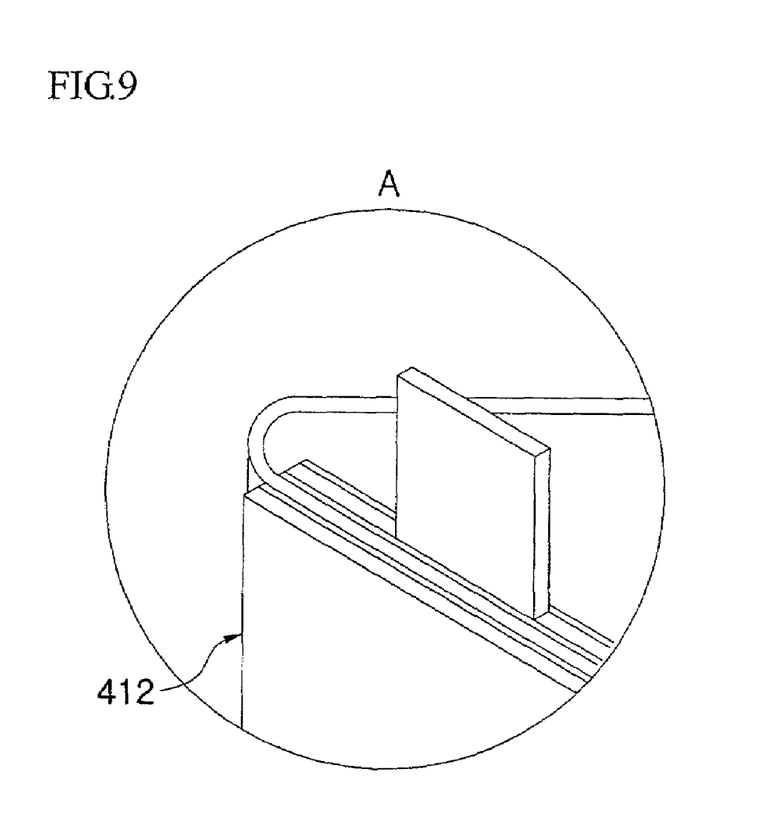
FIG. 9 is a perspective view of an unfolded structure of the lithium secondary cell including the first cathode plate positioned on a separator film.
Figure 10:
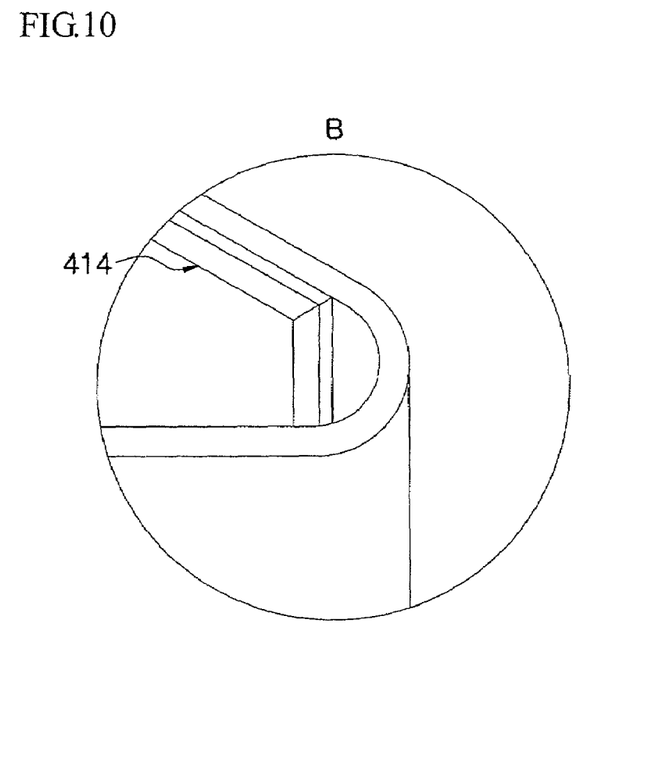
FIG. 10 is a perspective view of an unfolded structure of the lithium secondary cell including the last cathode plate positioned on a separator film.

Generally, all the cathode and anode plates 300(400) except the first electrode plate 412 and last electrode plate 414 have double-sided coated structure. Depicted in FIG. 9, FIG. 10, and FIG. 13, the first electrode plate (cathode plate 412) and the last electrode plate (cathode plate 414) have a one-sided coating structure. The reason for coating only one side of the first and last electrode plates is that each activator must have a corresponding opposite activator to be operable.

The separator film 200 for insulating the cathode and anode plates 300 and 400 is generally formed of a polymeric porous film made of polyethylene(PE) or polypropylene (PP), and has a single layer structure or a multi layer structure.

Figure 7:
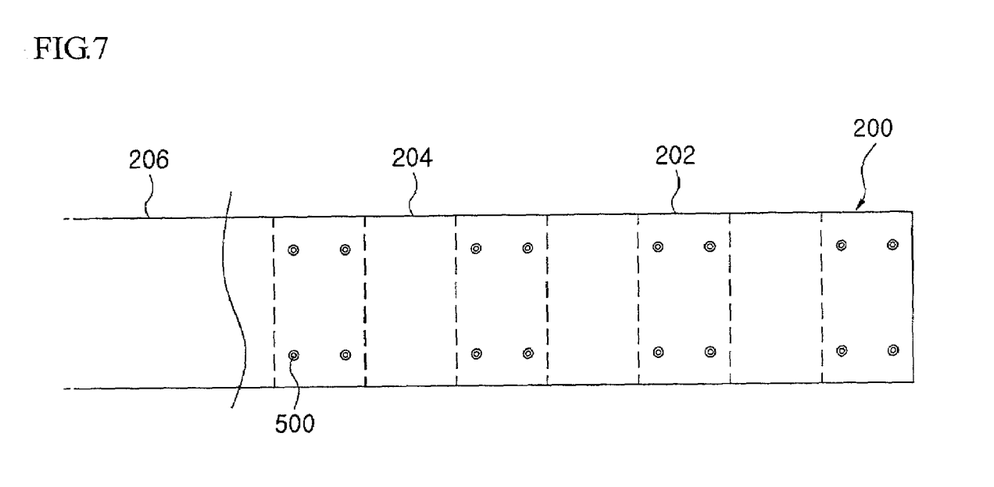
FIG. 7 is a top view of an embodiment of an unfolded structure of the lithium secondary cell of the present invention.

On the surface of the separator film 200, there are attached the cathode and anode plates 300 and 400 by an ion-conductive adhesive 500 not interfering with a conductivity of lithium ion. A cell plate 100 having such a triple-layer structure of the cathode plates 300/the separator film 200/the anode plates 400 is repeatedly folded such that the anode plates 400 and the cathode plates 300 are arranged in an alternating fashion, as shown in FIG. 3. As previously indicated an ion-conductive adhesive 500 may be utilized in the present invention to adhere the anode and catode plates 300 and 400 to the separator film 200. Examples of ion-conductive adhesives that may be utilized include, but are not limited to SBR Latex compound adhesives and their derivatives, acrylic solvent adhesives, an adhesive utilizing PAN (homo, co-polymer), an adhesive utilizing PAN/PVDF blending, MMA/PMMA polymer adhesive and combinations thereof. The ion-conductive adhesive 500 may be applied to the separator film 200 in any suitable fashion, adhering pattern, position on the film 200 or amount. In one embodiment of the present invention, as depicted in FIG. 7, the ion conductive adhesive is applied to the separator in a square adhering pattern at approximately the four corners of the square for adhering each cathode or anode plate, 300 or 400. The shape of the adhesive applied to each position may be in the form of a ring, as illustrated in FIG. 7. However any suitable shape or configuration for each individual adhesive application or pattern may be utilized. It is noted that the ion conductive adhesive 500 may substantially dissipate when the lithium secondary cell is used. In the process of the manufacturing the present invention, the vanishment of the ion conductive adhesive is beneficial to the process and overall product.

Finally, the lithium secondary cell of the present invention may include one or more electrolytes. Examples of electrolytes that may be utilized in the present invention include, but are not limited to ethylene carbonate, diethylene carbonate, ethyl methyl carbonate or combinations thereof.

A method of fabricating the lithium secondary cell in accordance with an embodiment of the present invention will now be described in detail with reference to FIGS. 2 and 3.

As shown in FIG. 2, a plurality of cathode plates 300 having a desired size are adhered on one surface of the separator film 200 for insulating the cathode and anode plates while being uniformly spaced apart from one another. On the other surface of the separator film 200, there are adhered a plurality of anode plates 400 having a desired size, at spaced positions corresponding to the cathode plates 300. In this way, a crude cell of a cell plate 100 is fabricated having a triple-layer structure of the cathode plates 300/the separator film 200/the anode plates 400.

Figure 3:
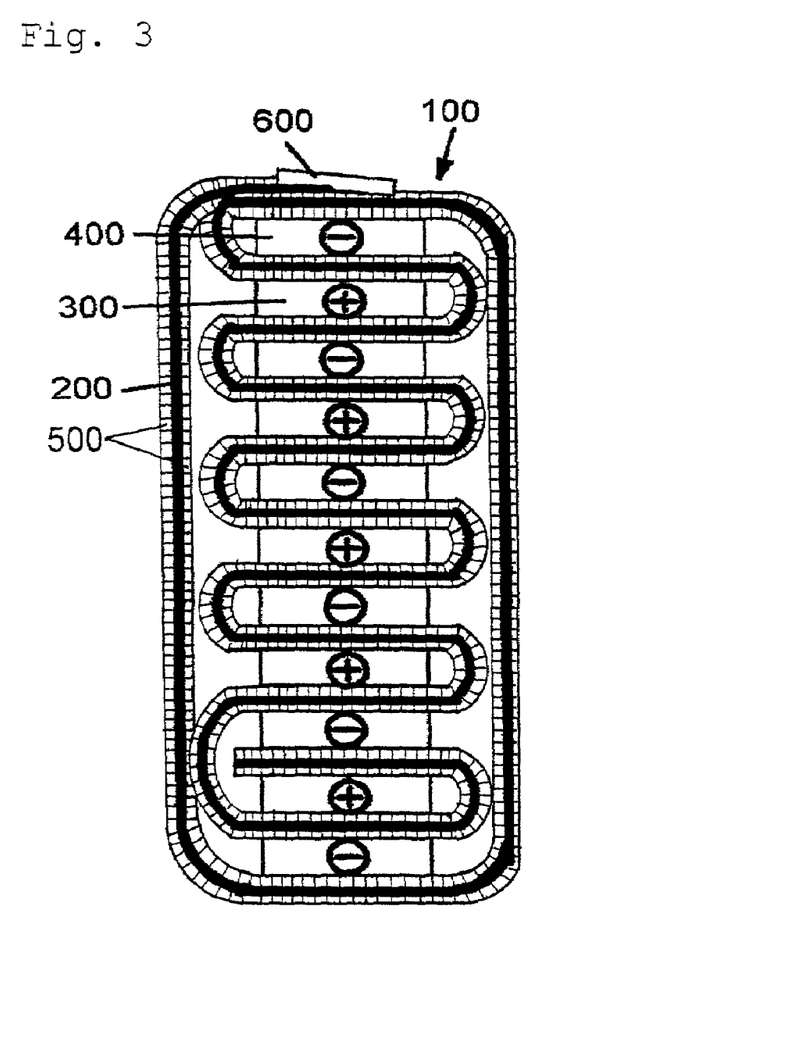
FIG. 3 is a cross-sectional view showing a folded structure of the lithium secondary cell of FIG. 2.
Figure 4:
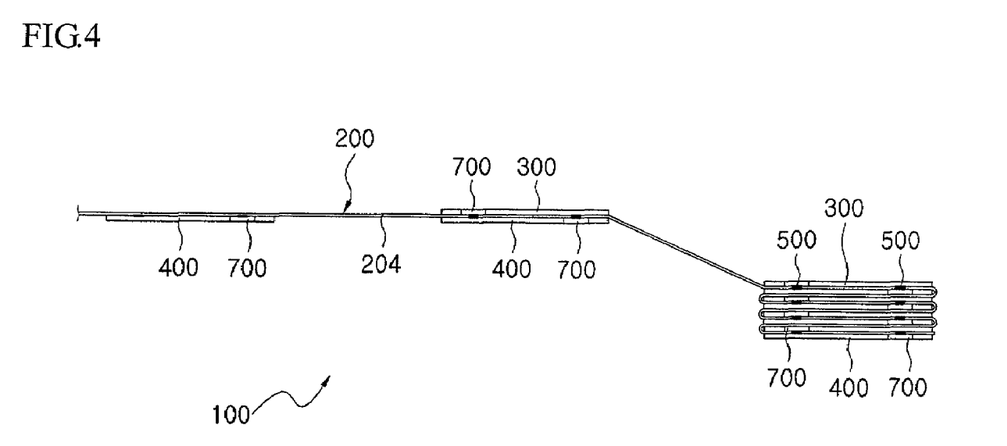
FIG. 4 is a side view of a partially folded structure of the lithium secondary cell of FIGS. 2 and 3.
Figure 5:
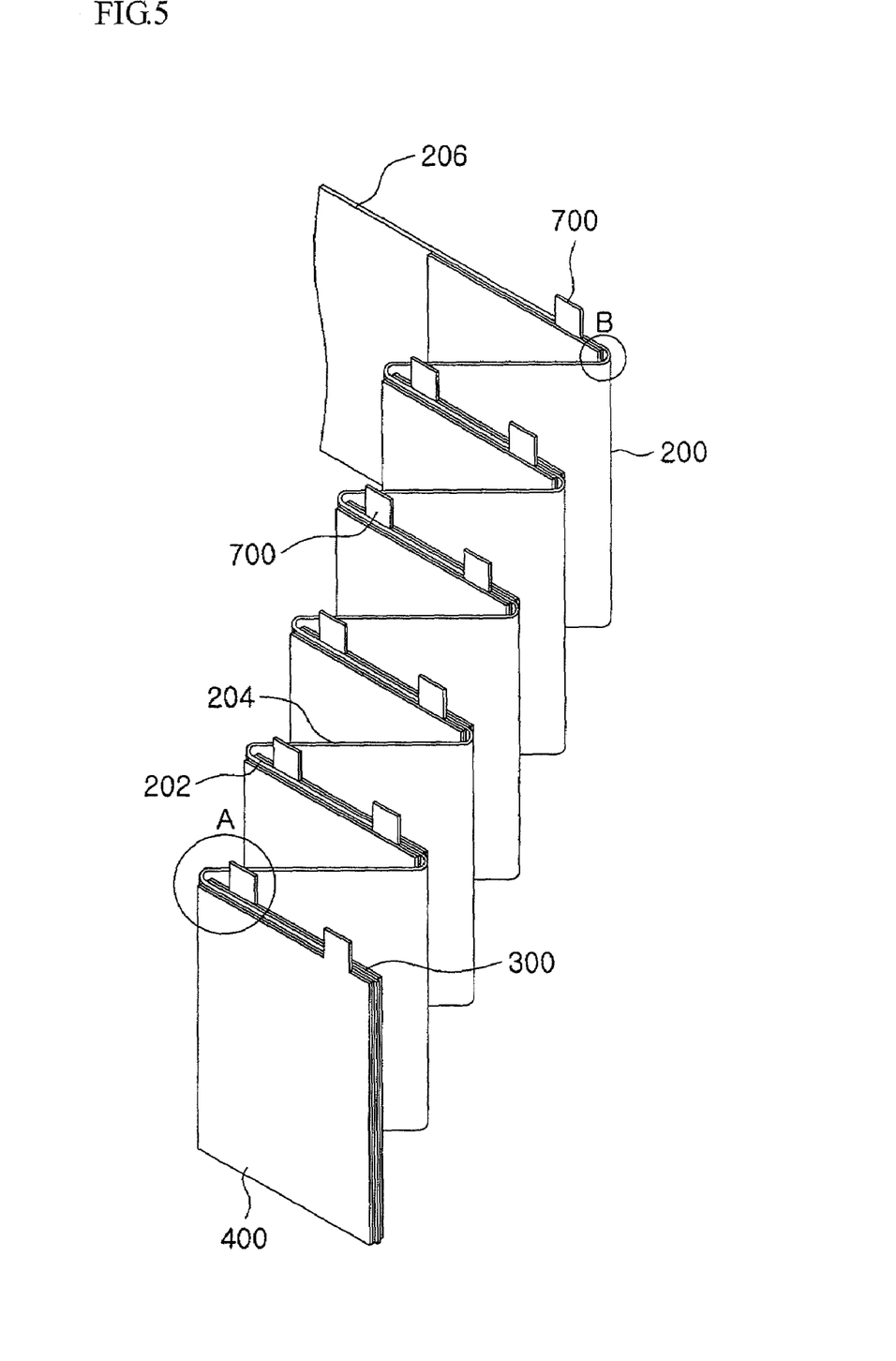
FIG. 5 is a perspective view of an unfolded structure of the lithium secondary cell of FIGS. 2 and 3.

FIGS. 4, 5 and 7 depict partially folded and unfolded illustrations of the embodiment shown in FIG. 3. FIGS. 4 and 5 further illustrate the fold/fold feature of the present invention as shown in FIG. 3, wherein a single separator film 200 is utilized to separate the cathode plates 300 and anode plates 400 of the lithium secondary cell.

As previously suggested FIG. 4 and FIG. 5 depict lithium secondary cells that are in partially folded and unfolded configurations, respectively. Generally, the fold/fold feature comprises a separator 200 that includes one or more separating parts 204 and a plurality of adhering parts 202. Commonly, the cathode plates 300 are adjoined to one side of the separator film 200 at adhering parts 202 and the anode plates 400 are adjoined to the separator film 200 on the opposite side of the adhering parts 202, proximate to the corresponding cathode plates 300. It is noted that the cathode plates 300 and the anode plates may be adhered to the separator film 200 simultaneously, thereby increasing overall production efficiency as well as lithium secondary cell quality. For example, a cathode plate 300 may be pressed to one side of a separator film 200 at the same time an anode plate 400 is being pressed to the corresponding opposite side of the separator film 200.

Figure 6:
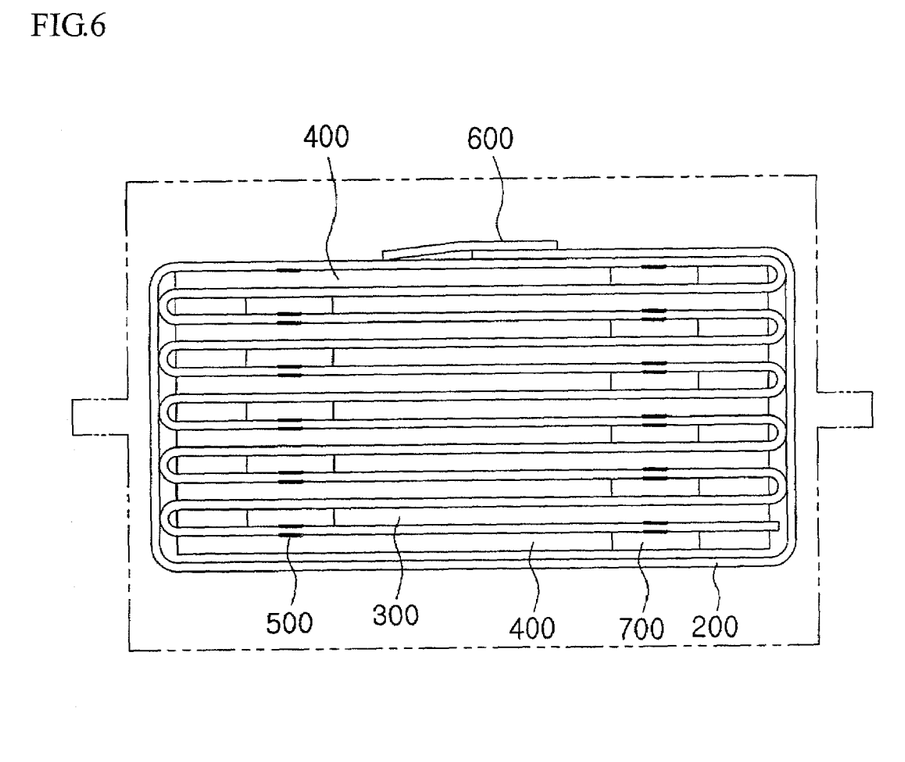
FIG. 6 is a cross-sectional view showing a folded structure of the lithium secondary cell of FIG. 2.

A separating part 204 is positioned between each adhering part 202 and is generally of a width slightly larger than the width of one of adjacent adhering parts 204. The size or width of the separating part 204 may vary depending on the size of the plates, but normally is of sufficient size to completely cover an adjacent cathode plate 300 or anode plate 400 when the separator film is folded to the final position as depicted in FIGS. 3 and 6. The lithium secondary cell alternates folded parts of the separator film 200 by alternating with each fold of the separator film 200 a separating part 204 and an adhering part 202 to produce the fold/fold configuration. Finally, as depicted in FIGS. 3 and 6, the final folded position of the separator film 200 allows for the exposure and securement of the positive and negative electrodes 700 operably adjoined to each cathode plate 300 and anode plate 400.

In the prior art, the cathode and anode plates 2 and 3 are heat- adhered (laminated) to the separator film 1 to fabricate the unit cell, and a plurality of the unit cells are laminated to fabricate the cell. In contrast with this, in the present invention, the cathode and anode plates 300 and 400 are not heat-adhered to the separator film 200. In accordance with the present invention, after the cathode plates 300 and the anode plates 400 are adhered to the separator film 200, the fabricated cell plate 100 is repeatedly folded, depending on an application and size of the resulting cell, such that the anode plates 400 and the cathode plates 300 are arranged in an alternating fashion, as shown in FIG. 3. Then, the resulting cell is attached with electrode tabs 600 to produce a desired lithium secondary cell.

Figure 13:
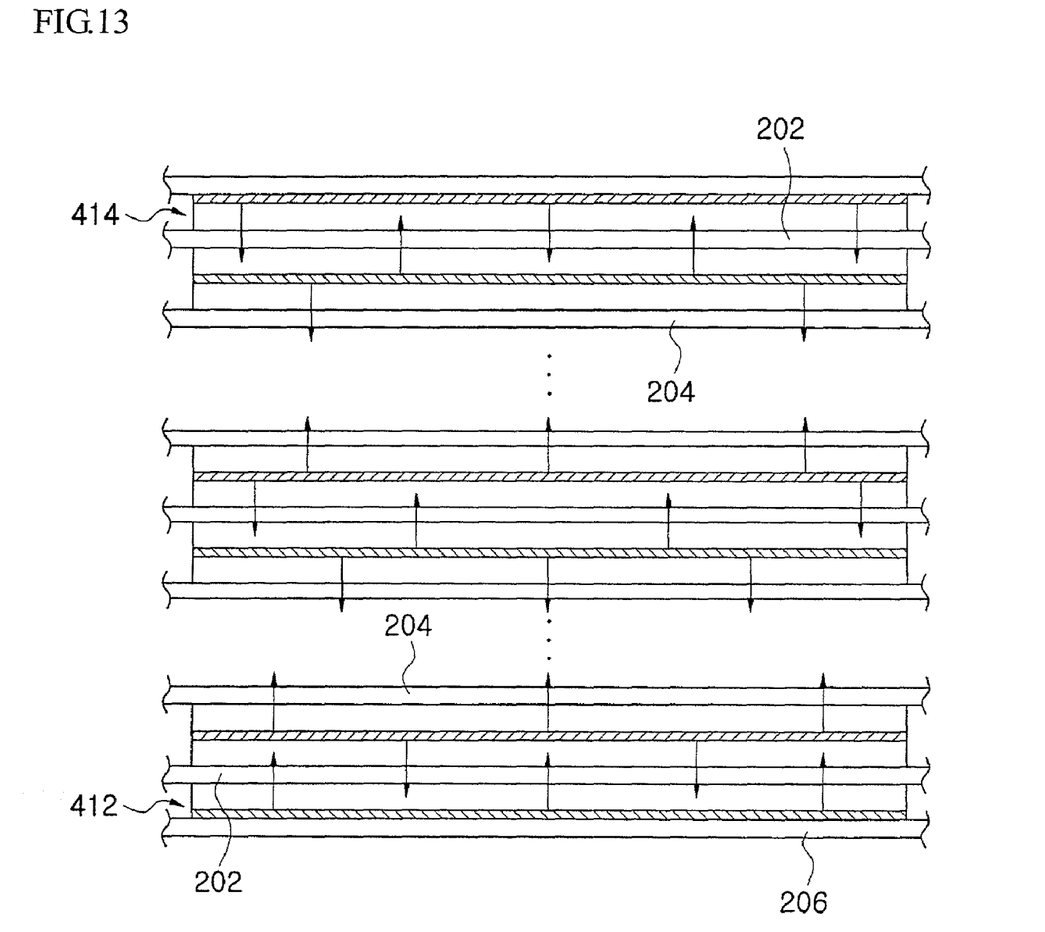

FIG. 13 illustrates cross sectional views of select layers of one embodiment of the lithium secondary cell of the present invention. The arrows indicate the direction of flow of the lithium ions within the lithium secondary cell when in operation.

Figure 8:
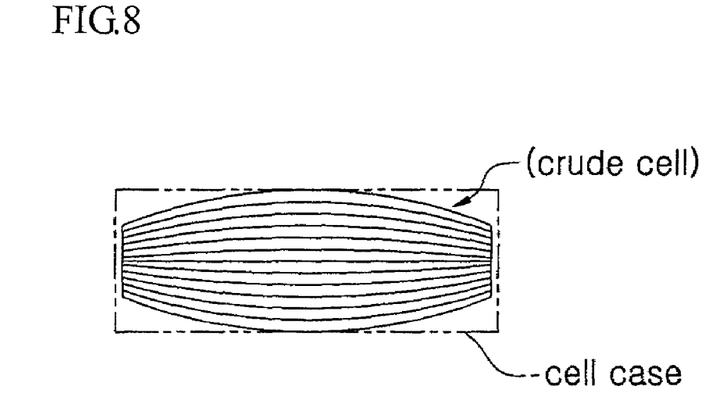
FIG. 8 is a cross-sectional view showing a swollen folded structure of a lithium secondary cell.

As apparent from the above description, the present invention provides the lithium secondary cell and the method of fabricating the same, in which the cathode plate 300 and anode plates 400 having a desired size are adhered onto the separator film 200 to form the cell plate 100 which is then repeatedly folded, such that the anode plates 400 and cathode plates 300 are arranged in an alternating fashion. As depicted in FIG. 8 the lithium secondary cell of the present invention may be swollen according to the fold/fold structure. Therefore, the present invention allows the lithium secondary cell to be fabricated having improved performance and particular safety by preventing a firing caused by high current and excessive voltage charged, while having various shapes and sizes, and a desired capacity and achieving a simplified fabrication.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A lithium secondary cell comprising:
   a single separator film including a plurality of adhering parts and one or more separating parts;
   a plurality of cathode plates adhered to the adhering parts on one side of the single separator film and spaced apart by separating parts that are at least the size of the largest cathode plate adjacent to the separating part;
   a plurality of anode plates adhered to the adhering parts on the opposite side of the single separator film as the cathode plates and at spaced positions corresponding to the cathode plates so as to be separated by separating parts that are at least the size of the largest anode plate adjacent to the separating part; and
   the separator film attached with the anode plates and the cathode plates is repeatedly folded such that the anode plates and the cathode plates are arranged in an alternating fashion.

2. The lithium secondary cell of claim 1, wherein each anode plate and cathode plate includes an electrode separated from other electrodes of anode plates and cathode plates until folded.

3. The lithium secondary cell of claim 1, wherein the separator film is formed of a polymeric single- or multi-layer film made of polyethylene or polypropylene.

4. The lithium secondary cell of claim 1, wherein the cathode and anode plates are adhered to the separator film by an adhesive.

5. The lithium secondary cell of claim 4, wherein the adhesive substantially dissipates following assembly of the lithium secondary cell.

6. A method of fabricating a lithium secondary cell, comprising the steps of:
   applying an adhesive to adhering parts on a single separator film;
   adhering a plurality of cathode plates to the adhering parts on one side of the separator film wherein each cathode plate is spaced apart from each adjacent cathode plate by a separating part that is at least the size of the largest cathode plate adjacent to the separating part;
   adhering a plurality of anode plates to the adhering parts on the opposite side of the separator film wherein each anode plate is spaced apart from each adjacent anode plate by a separating part that is at least the size of the largest anode plate adjacent to the separating part; and
   repeatedly folding the separator film such that the anode plates and the cathode plates are arranged in an alternating fashion.

7. The method of fabricating a lithium secondary cell of claim 6, wherein each anode plate and cathode plate includes an electrode separated from electrodes of other anode plates and cathode plates until folded.

8. The method of fabricating a lithium secondary cell of claim 6, wherein the cathode and anode plates are adhered to the separator film by an adhesive.

9. The method of fabricating a lithium secondary cell of claim 8, wherein the adhesive substantially dissipates following assembly of the lithium secondary cell.

10. The method of fabricating a lithium secondary cell of claim 6, wherein the cathode plates and anode plates are adhered simultaneously to the separator film.

11. The lithium secondary cell of claim 4, wherein the adhesive is ion-conductive.

12. The lithium secondary cell of claim 4, wherein the adhesive is selected from the group consisting of:
 (a) SBR Latex compound adhesives and their derivatives;
 (b) acrylic solvent adhesives;
 (c) an adhesive utilizing polyacrylonitrile, acrylonitrile homopolymer, or acrylonitrile copolymer;
 (d) an adhesive utilizing polyacrylonitrile/polyvinylidene fluoride blending;
 (e) MMA/PMMA polymer adhesive; and
 (f) combinations of (a), (b), (c), (d), or (e).

13. The lithium secondary cell of claim 1, further comprising an electrolyte.

14. The lithium secondary cell of claim 13, wherein the electrolyte is selected from the group consisting of:
 (a) ethylene carbonate;
 (b) diethylene carbonate;
 (c) ethyl methyl carbonate; and
 (d) combinations of (a), (b), or (c).

15. The lithium secondary cell of claim 1, further comprising an electrode tab attached to the cell.

16. The method of fabricating a lithium secondary cell of claim 8, wherein the adhesive is ion-conductive.

17. The method of fabricating a lithium secondary cell of claim 8, wherein the adhesive is selected from the group consisting of:
 (a) SBR Latex compound adhesives and their derivatives;
 (b) acrylic solvent adhesives;
 (c) an adhesive utilizing polyacrylonitrile, acrylonitrile homopolymer, or acrylonitrile copolymer;
 (d) an adhesive utilizing polyacrylonitrile/polyvinylidene fluoride blending;
 (e) MMA/PMMA polymer adhesive; and
 (f) combinations of (a), (b), (c), (d), or (e).

18. The method of fabricating a lithium secondary cell of claim 6, further comprising implementing an electrolyte in the cell to transport ions between the anode plates and the cathode plates.

19. The method of fabricating a lithium secondary cell of claim 18, wherein the electrolyte is selected from the group consisting of:
 (a) ethylene carbonate;
 (b) diethylene carbonate;
 (c) ethyl methyl carbonate; and
 (d) combinations of (a), (b), or (c).

20. The method of fabricating a lithium secondary cell of claim 6, further comprising attaching an electrode tab to the cell.

* * * * *